United States Patent
Park et al.

(10) Patent No.: US 6,270,691 B2
(45) Date of Patent: Aug. 7, 2001

(54) POLYMER LIQUID CRYSTAL EMULSION STABILIZED BY WATER SOLUBLE COPOLYMER, LIQUID CRYSTAL COMPOSITE FILM AND METHOD FOR PREPARING THEREOF

(75) Inventors: Soo-Jin Park; Jae-Rock Lee, both of Daejeon; Mun-Han Kim, Kyungsangbuk-do, all of (KR)

(73) Assignee: Korea Research Institute of Chemical Technology, Daejeon (KR)

( * ) Notice: Subject to any disclaimer, the term of this patent is extended or adjusted under 35 U.S.C. 154(b) by 0 days.

(21) Appl. No.: 09/258,346

(22) Filed: Feb. 26, 1999

(30) Foreign Application Priority Data

Oct. 28, 1998 (KR) .................................................. 98-46527

(51) Int. Cl.[7] ............................ C09K 19/52; C09K 19/54
(52) U.S. Cl. ................................. 252/299.01; 252/299.5
(58) Field of Search ............................ 252/299.01, 299.5

(56) References Cited

U.S. PATENT DOCUMENTS

| | | | | |
|---|---|---|---|---|
| 4,435,047 | * | 3/1984 | Fergason | 359/103 |
| 4,688,900 | * | 8/1987 | Doane et al. | 359/103 |
| 5,270,843 | * | 12/1993 | Wang | 359/52 |
| 5,479,278 | * | 12/1995 | Takeuchi et al. | 359/52 |
| 5,571,448 | * | 11/1996 | Wartenberg et al. | 252/299.5 |
| 5,776,364 | * | 7/1998 | Niiyama et al. | 252/299.01 |
| 5,835,174 | * | 11/1998 | Clikeman et al. | 349/86 |
| 5,843,332 | * | 12/1998 | Takeuchi et al. | 252/299.01 |
| 5,843,333 | * | 12/1998 | Hakemi | 252/299.5 |
| 5,932,137 | * | 8/1999 | Baba et al. | 252/299.66 |
| 5,958,290 | * | 3/1984 | Coates et al. | 252/299.01 |
| 5,976,405 | * | 11/1995 | Clikeman et al. | 252/299.01 |

* cited by examiner

Primary Examiner—C. H. Kelly
(74) Attorney, Agent, or Firm—Staas & Halsey LLP

(57) ABSTRACT

A polymer liquid crystal emulsion includes a liquid crystal and a water soluble copolymer obtained by polymerizing a hydrophilic monomer with one or more hydrophobic monomers. The concentration of the hydrophobic monomer may be 14 to 25% by weight based on the combined weight of the hydrophobic monomer and the hydrophilic monomer. The hydrophobic monomer may be styrene, methyl methacrylate, vinyl acetate, acrylate or methacrylate. The hydrophilic monomer may be acrylamide, acrylonitrile or acryloylchloride. Preferably, the hydrophilic monomer is acrylamide or a derivative thereof and the hydrophobic monomer is styrene, methyl methacrylate or vinyl acetate. The liquid crystal may be a nematic liquid crystal formed of an azomethine compound or an azo compound. The water soluble copolymer, the liquid crystal and water may form a liquid crystal/aqueous polymer solution. In this case, the concentration of the liquid crystal in the liquid crystal/ aqueous polymer solution is in the range of 50 to 70% by weight. A nematic curvilinear alignment phase film may be formed from the polymer liquid crystal emulsion and a pair of plates sandwiching the polymer liquid crystal emulsion.

19 Claims, 7 Drawing Sheets

- LIQUID CRYSTAL (LC)

- COPOLYMER HAVING ADVANCED HYDROPHOBIC PROPERTY

- DISTILLED WATER

- LIQUID CRYSTAL (LC)
- COPOLYMER HAVING ADVANCED HYDROPHOBIC PROPERTY
- DISTILLED WATER

RANDOM COPOLYMER
— HYDROPHILIC CHAIN
— HYDROPHOBIC CHAIN

POLYMER LIQUID CRYSTAL EMULSION STABILIZED BY WATER SOLUBLE COPOLYMER, LIQUID CRYSTAL COMPOSITE FILM AND METHOD FOR PREPARING THEREOF

BACKGROUND OF THE INVENTION

1. Field of the Invention

The present invention relates to a polymer liquid crystal emulsion, having improved dispersibility of the liquid crystal and stability of the dispersed liquid crystal by imparting part of a hydrophobic property to a polymer. It also relates to a nematic curvilinear alignment phase film using the polymer liquid crystal emulsion produced by the present invention, and to a method for producing the same.

2. Description of the Related Art

As a medium for transmitting various kinds of information in the Age of Information, a liquid crystal display (hereinafter referred to as "LCD") is one of the most widely used apparatuses together with a cathode ray tube (hereinafter referred to as "CRT"). However, LCDs adopting a twisted nematic (hereinafter referred to as "TN") mode or a super twisted nematic (hereinafter referred to as "STN") mode which have been most widely used, necessitate the use of dispersing agents to control the size of the dispersed liquid crystals and to improve the stability of the liquid crystal. Therefore, the development of a new polymer matrix to be used in LCDs has become urgently sought.

The development of the polymer dispersion liquid crystal (referred to as "PDLC") composite films for liquid crystal display elements arose from using liquid crystals in new polymer material fields having electro-optical properties. The method for preparing PDLC composite films necessitates a phase separation procedure, so that low molecular weight nematic crystal liquids can be dispersed evenly in a polymer matrix. There are three phase separating methods, polymerization induced phase separation, thermally induced phase separation and solvent induced phase separation methods. In the present invention, a nematic curvilinear aligned phase (hereinafter referred to as "NCAP") method which allows for the formation of liquid crystal dispersion polymer composite film of PDLC film is employed, although it is not a phase separation method. The NCAP method refers to a method for preparing a PDLC shutter by dispersing and emulsifying a nematic liquid crystal capsule in a water-soluble polymer solution, applying the emulsion onto a conductive transparent plate, drying the emulsion to form a PDLC film, and then laminating another conductive transparent plate. The liquid crystal droplets are neither linked to each other nor dispersed in a regular size and show a very high contrast ratio.

The NCAP method used in the present invention is very simple and economical, and may be employed in many applications. The heart of this method is the technology for controlling the size and stability of liquid crystals when they are dispersed in a water soluble polymer. Therefore, the dispersion technology plays an important role in the properties of the finally completed film. Some researchers have reported employing water soluble copolymers having some hydrophobic group(s) in oil-in-water systems in order to increase the dispersion stability of non-ordered low molecular weight molecules. However, research regarding the emulsification of liquid crystals in water soluble polymer solutions has not yet been conducted on a large scale, and this subject is interesting in view of both theoretical and practical use.

In the related art of preparing PDLC films, the use of dispersing agents is essential in order to improve the dispersibility of liquid crystals in a hydrophilic polymer matrix. Unlike oil-in-water systems, the dispersion of nematic liquid crystals necessitates these dispersing agents to increase the stability of the liquid crystals because the liquid crystals have an ordered structure and a relatively high viscosity.

However, PDLC films prepared by the above methods have the following demerits. Chiefly, the response rate is slow. After removing the electrical field, it takes a long time for liquid crystals to be restored to their original position. In addition, the liquid crystals of these devices amount to about 80 to 85% by weight of the device, making the manufacturing cost too expensive. In addition, the required dispersing agents may decrease the desirable properties of NCAP film as a display.

SUMMARY OF THE INVENTION

Accordingly, the present invention aims to obtain a highly functional polymer liquid crystal composite film, a NCAP film, having improved liquid crystal dispersibility and stability, without using dispersing agents.

According to the present invention, a polymer liquid crystal emulsion includes a liquid crystal and a water soluble copolymer obtained by polymerizing a hydrophilic monomer with one or more hydrophobic monomers. The concentration of the hydrophobic monomer may be 14 to 25% by weight based on the combined weight of the hydrophobic monomer and the hydrophilic monomer. The hydrophobic monomer may be styrene, methyl methacrylate, vinyl acetate, acrylate or methacrylate. The hydrophilic monomer may be acrylamide, acrylonitrile or acryloylchloride. Preferably, the hydrophilic monomer is acrylamide or a derivative thereof and the hydrophobic monomer is styrene, methyl methacrylate or vinyl acetate. The liquid crystal may be a nematic liquid crystal formed of an azomethine compound or an azo compound. The water soluble copolymer, the liquid crystal and water may form a liquid crystal/aqueous polymer solution. In this case, the concentration of the liquid crystal in the liquid crystal/aqueous polymer solution is in the range of 50 to 70% by weight.

A nematic curvilinear alignment phase film may be formed from the polymer liquid crystal emulsion and a pair of plates sandwiching the polymer liquid crystal emulsion.

The nematic curvilinear alignment phase film may be formed by a process having the steps of polymerizing the hydrophilic monomer with one or more hydrophobic monomers to form a water soluble copolymer, washing and drying the water soluble copolymer and then dissolving the water soluble copolymer in water to form a solution, dispersing the liquid crystal into the solution to produce a liquid crystal/polymer aqueous solution, and placing the liquid crystal/polymer aqueous solution between glass substrates in order to remove water therefrom.

Other objects and features of the present invention will become apparent upon analysis of the following detailed description, to those skilled in the art of this technology. It should be understood, however, that the detailed description and specific examples, while indicating preferred embodiments of the present invention, are given by way of illustration and not by way of limitation. Many changes and modifications within the scope of the present invention may be made without departing from the spirit thereof, and the invention includes all such modifications.

BRIEF DESCRIPTION OF THE DRAWINGS

These and other objects and advantages of the invention will become apparent and more readily appreciated from the following description of the preferred embodiments, taken in conjunction with the accompanying drawings of which.

DESCRIPTION OF THE PREFERRED EMBODIMENTS

Figure 1:
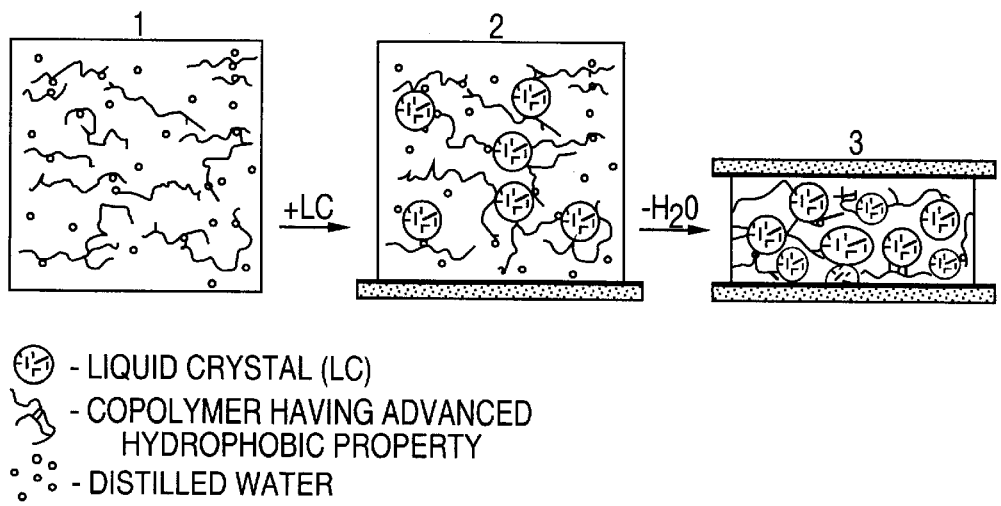
FIG. 1 shows a schematic view of the method for preparing NCAP films from a liquid crystal emulsion of a water soluble polymer according to the present invention.

Reference will now made in detail to the present preferred embodiments of the present invention, examples of which are illustrated in the accompanying drawings.

The present invention relates to a liquid crystal emulsion for NCAP films with liquid crystals having improved dispersibility and stability in a polymer matrix. The matrix is formed by copolymerization of a hydrophilic monomer and one or more hydrophobic monomers.

The copolymers used for the matrix of the NCAP films are water soluble. The hydrophilic monomers give the copolymer the water soluble property. Compounds which are polymerizable and have polar substituents, for example, acrylamide, acrylonitrile and acryloylchloride are particularly suitable for the hydrophilic monomer. Acrylamide is the most preferred of these monomers.

The hydrophobic monomer enables a polymer structure capable of being adsorbed into liquid crystals. For the hydrophobic monomer, compounds which are polymerizable and do not have polar substituents should be used. Examples of hydrophobic monomers include styrene, methyl methacrylate, vinyl acetate, acrylate and methacrylate. Among them, styrene, methyl methacrylate and vinyl acetate are especially preferred.

The content of hydrophobic monomer(s) can be varied, but is preferably 10 to 25% by weight on the basis of the total weight of the copolymer. When the content of hydrophobic monomer(s) is less than 10% by weight, the dispersibility of liquid crystals in a liquid crystal/aqueous polymer solution is very slow, and the coalescence time (the time required for droplets of liquid crystal to coalescence with each other) is short. The coalescence time is a measure of the stability of a dispersed liquid crystal. On the other hand, when the content of hydrophobic monomer(s) is more than 25% by weight, the compatibility of the copolymer with the liquid crystal increases such that there are more hydrophobic portions of the copolymer to be adsorbed on the surface of the droplets of liquid crystals. However, since solubility in water decreases, there is reduced dispersibility of the liquid crystals. Therefore, such a copolymer is not suitable as a matrix for a PDLC film.

Examples of copolymers types usable in the present invention are conventional copolymers types. For example, random copolymers, alternative copolymers, block copolymers and graft copolymers can be used. Random copolymers can be easily synthesized by a generic method without any special procedure for the specific copolymer being made. On the contrary, when preparing alternative copolymers, block copolymers and graft copolymers, special catalysis and reaction mechanisms should be considered in accordance with the type of monomers used and copolymer made. Thus, random copolymers have been predominantly used in the preparation of PDLC films. The method for synthesizing block copolymers is relatively complicated as compared to that of random copolymers. However, for these coalescence occurs between hydrophobic groups resulting in the copolymer showing properties of the hydrophobic monomer. Accordingly, random copolymers and block copolymers are preferred in the present invention.

The structure of a polyacrylamide monomer conventionally used is as follows:

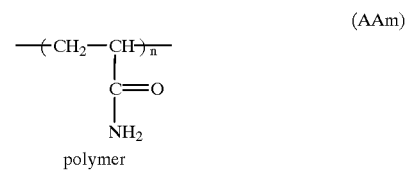
(AAm)
polymer

Examples of other copolymer monomers which can be used are as follows:

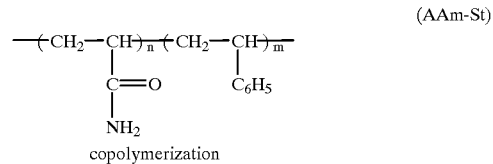
(AAm-St)
copolymerization

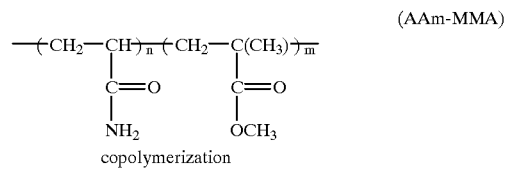
(AAm-MMA)
copolymerization

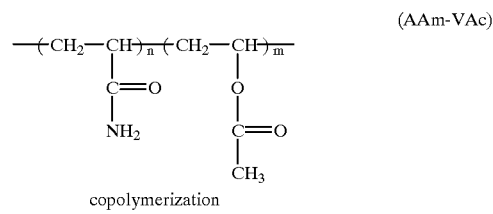
(AAm-VAc)
copolymerization

In the above, "AAm" represents acrylamide, "St" represents styrene, "MMA" represents methyl methacrylate and "VAc" is vinyl acetate.

Examples of nematic liquid crystals usable in the present invention are azomethine compounds, azo compounds, ester compounds and biphenyl compounds. Among those, azomethine compounds and azo compounds are particularly preferred.

Figure 2:
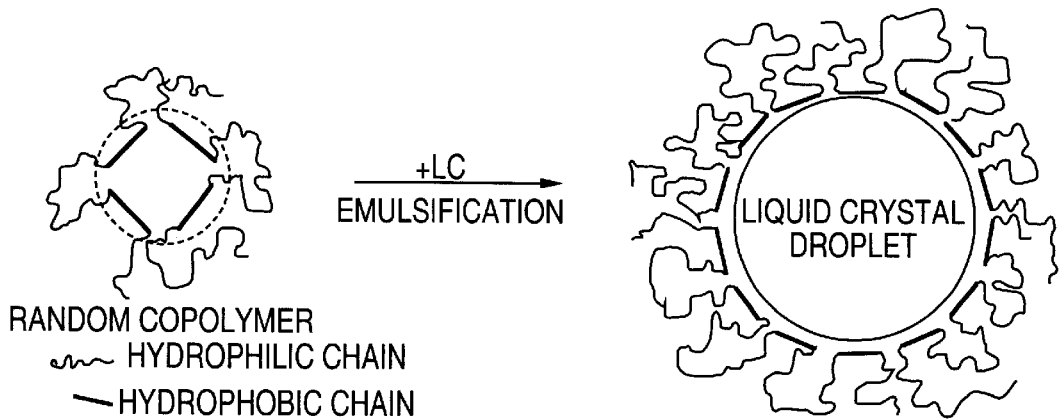
FIG. 2 shows a schematic view of the formation of an emulsion between a liquid crystal capsule and a copolymer synthesized according to the present invention.

In order to determine the stability of a dispersion between two liquid phases, the stereo stability due to water-soluble polymers in oil-in-water systems was employed. As seen in FIG. 2, the hydrophobic groups of water-soluble polymers are adsorbed onto the surface of the liquid crystal. The adsorption at the interface between the two liquid phases results in a reduced interfacial tension. The hydrophobic groups of the polymer chain are selectively adsorbed into the liquid crystals at the boundary of the two liquid phases (namely, the water phase and the liquid crystal phase). Such physical adsorption of a polymers can effectively form a stable liquid crystal emulsion. Also there are no sterically stabilized polymer chains inside of the liquid crystals.

The concentration of liquid crystal in the liquid crystal/ aqueous polymer solution is in the range of 50 to 70% by weight. Although other concentrations are possible, when the concentration of liquid crystal is less than 50% by weight, the maximum transmittance ($T_{max}$) and minimum transmittance ($T_{min}$) both increase. The minimum transmittance increases faster than the maximum transmittance, result in reduced contrast, as calculated by $T_{max}/T_{min}$. When the concentration of liquid crystals exceeds 70% by weight, the minimum transmittance and maximum transmittance both decrease. Accordingly, the liquid crystal/aqueous polymer solution fails to display electro-optical properties suitable for NCAP films in display devices.

The present invention also relates to a highly functional NCAP film produced by using the liquid crystal emulsion of the present invention.

When a NCAP film is prepared from the liquid crystal emulsion, the film demonstrates properties unique to the liquid crystal capsules themselves due to the stabilization of the liquid crystal in comparison to other liquid crystal display materials. Such a NCAP film has many advantages such as:

i) there is no need to use polarizing plates, ii) the amount of the transmitted light is larger than that of the films using polarizing plates and thus the film has good brightness, iii) the complicated procedure of aligning the liquid crystals may be omitted, which renders the display easy to prepare, iii) the film is capable of being formed into a large plate on account of the reason mentioned in iii), iv) the production cost is cheaper than other films, and v) since the liquid crystal capsules are dispersed in a polymer matrix and thus flexible, the film itself is very stable.

The present invention also relates to a method for producing said highly functional NCAP films.

NCAP films according to the present invention can be prepared with the following method. Firstly, a hydrophilic monomer is polymerized with one or more hydrophobic monomers to form a copolymer. The copolymer is washed and dried and then dissolved in water. To this solution, a liquid crystal is dispersed to form a liquid crystal/aqueous polymer solution, which is placed between glass substrates to remove any water, thereby obtaining a PDLC film. The NCAP films may be obtained by conventional methods for preparing NCAP films, except that different raw materials are required.

The present invention is described in more detail via the following examples without limiting the scope of the invention in any way.

EXAMPLE 1

In a three-necked 100 ml flask equipped with a reflux condenser and a stirrer, non-water soluble styrene (manufactured by Junsei Chemical Co., in Japan) and water-soluble acrylamide (manufactured by Aldrich Co.) were polymerized in a solution containing 20% of dioxane. The content of styrene was 14% by weight based on the total weight of the monomer solution. As an initiator for polymerization, 3% by weight of azo-bis-isobutyronitrile was used. The reaction was conducted for 30 minutes at a temperature of 70° C. in the presence of nitrogen to produce an acrylamide-styrene copolymer. The synthesized copolymer was washed with acetone several times and dried in a vacuum to give 2.18 g of dry copolymer.

The structure and physical properties of the copolymer were evaluated. A NCAP film was formed by mixing the copolymer with a low molecular nematic liquid crystal mixture E-7$_{TM}$ (BL-001$_{TM}$, manufactured by Merck Co.), and the stability of the liquid crystal in the copolymer was measured.

As shown in FIG. 1, the NCAP film was prepared as follows. Firstly, the liquid crystal was added to the aqueous polymer solution to the desired concentration and evenly dispersed therein. After removing foam as necessary, the resultant solution was applied onto an indium-tin-oxide glass plate (2) by using a spacer to form a liquid film about 10 $\mu$m thick. This film was completely dried in a drier at 60° C. to obtain a NCAP film. Another indium-tin-oxide glass plate was placed over the NCAP film (3) to give a NCAP cell. The composition ratio, viscosity and contact angle of the newly synthesized copolymer are shown in Table 1.

EXAMPLE 2

The same procedure as in example 1 was carried out in a three-necked 100 ml flask equipped with a reflux condenser and a stirrer by using acrylamide (manufactured by Alrich Co.) and styrene (manufactured by Junsei Chemical Co.). However, for this example 0.75 g of the copolymer (AAm—St) was produced and the styrene content was adjusted to 20% by weight.

The structure and physical properties of the copolymer were measured. A NCAP film was formed by mixing the copolymer with a low molecular nematic liquid crystal mixture E-7$_{TM}$ (BL-001$_{TM}$, manufactured by Merck Co.), and the stability of the liquid crystal capsules in the copolymer was measured. The method for producing the NCAP film was the same as in Example 1. The composition ratio, viscosity and contact angle with this resulting copolymer are shown in Table 1.

Figure 8:
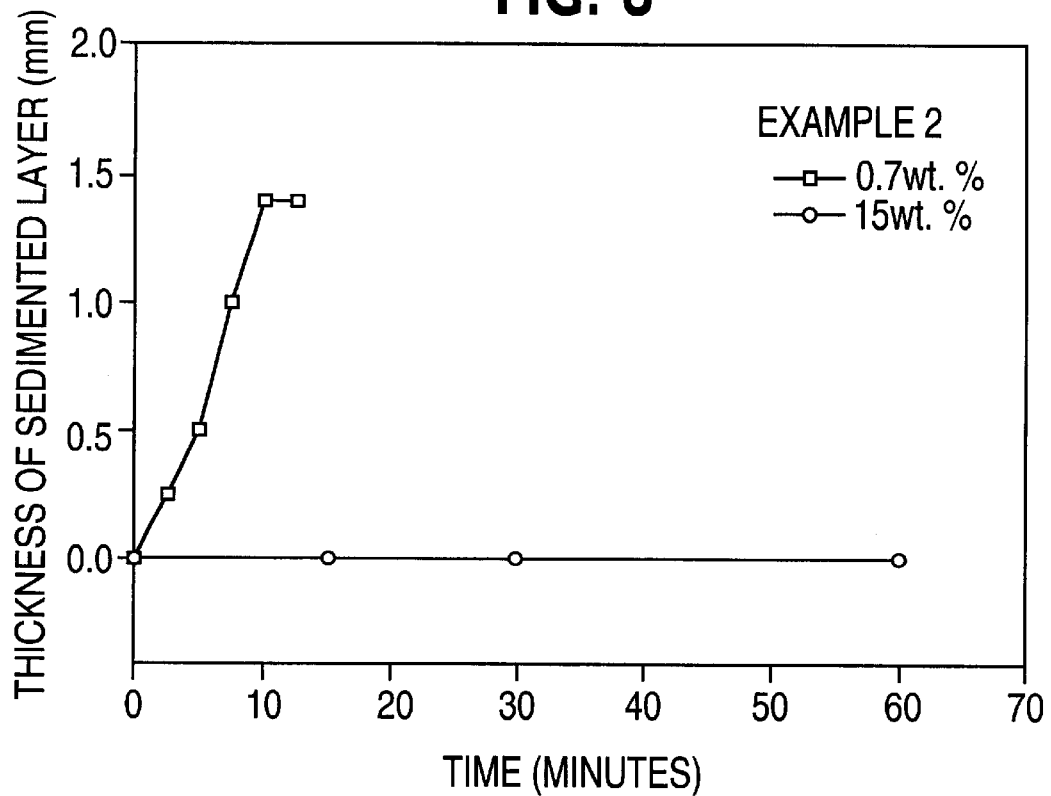
FIG. 8 shows how the thickness of a sedimented layer varies with time for liquid crystals dispersed in a copolymer (AAm—St) aqueous solution (liquid crystals:copolymer= 2:1).

In the production of NCAP films, it is desired that there be no sedimentation for the liquid crystal droplets. That is, a sedimented layer is not desired. The thickness of a sedimented layer versus time was evaluated for samples with copolymer concentrations of 0.7 wt. % and 15 wt. %. FIG. 8 shows the results of the evaluations. As shown in FIG. 8, when the copolymer concentration was 0.7 wt. %, the thickness of the sedimented liquid crystal layer rapidly increased to reach 1.4 mm within 10 minutes, and then the thickness remained at 1.4 mm. To the contrary, when the copolymer concentration was 15 wt. %, the sedimentation of the liquid crystal droplets did not occur even after a few hours. This fact leads to the conclusion that liquid crystal droplets are uniformly dispersed in this aqueous solution to be sterically stable and not to be sedimented.

EXAMPLE 3

The same procedure as in example 1 was carried out in a three-necked 100 ml flask equipped with a reflux condenser and a stirrer by using acrylamide (manufactured by Alrich Co.) and methyl methacrylate (manufactured by Junsei Chemical Co.). However, for this example 3.24 g of the copolymer (AAm-MMA) was produced, the non-water soluble methyl methacrylate content was adjusted to 15% by weight, and 1% by weight of azo-bis-isobutyronitrile was used as an initiator for polymerization.

The structure and physical properties of the copolymer were measured. A NCAP film was formed by mixing the copolymer with a low molecular nematic liquid crystal mixture E-7$_{TM}$ (BL-001$_{TM}$, manufactured by Merck Co.), and the stability of the liquid crystal in the copolymer was measured. The method for producing the NCAP film was the same as in Example 1. The composition ratio, viscosity and contact angle with this resulting copolymer are shown in Table 1.

EXAMPLE 4

The same procedure as in example 1 was carried out in a three-necked 100 ml flask equipped with a reflux condenser and a stirrer by using acrylamide (manufactured by Alrich Co.) and methyl methacrylate (manufactured by Junsei Chemical Co.). However, for this example 3.83 g of the copolymer (AAm-MMA) was produced and the non-water soluble methyl methacrylate content was adjusted to 19% by weight.

The structure and physical properties of the copolymer were measured. A NCAP film was formed by mixing the copolymer with a low molecular nematic liquid crystal mixture BL-036$_{TM}$ (manufactured by Merck Co.), and the stability of the liquid crystal in the copolymer was measured. The method for producing the NCAP film was the same as in Example 1. The composition ratio, viscosity and contact angle of the newly synthesized copolymer are shown in Table 1.

EXAMPLE 5

The same procedure as in example 1 was carried out in a three-necked 100 ml flask equipped with a reflux condenser and a stirrer by using acrylamide (manufactured by Alrich Co.) and methyl methacrylate (manufactured by Junsei Chemical Co.). However, for this example 2.8 g of the copolymer (AAm-MMA) was produced and the non-water soluble methyl methacrylate content was adjusted to 22% by weight.

The structure and physical properties of the copolymer were measured. A NCAP film was formed by mixing the copolymer with a low molecular nematic liquid crystal mixture BL-036$_{TM}$ (manufactured by Merck Co.), and the stability of the liquid crystal in the copolymer was measured. The method for producing the NCAP film was the same as in Example 1. The composition ratio, viscosity and contact angle with this resulting copolymer are shown in Table 1.

EXAMPLE 6

The same procedure as in example 1 was carried out in a three-necked 100 ml flask equipped with a reflux condenser and a stirrer by using acrylamide (manufactured by Alrich Co.) and methyl vinylacetate (manufactured by Junsei Chemical Co.). However, for this example 4.97 g of a copolymer (AAm-VAc) was produced, the non-water soluble methyl vinylacetate content was adjusted to 20% by weight, and 2% by weight of azo-bis-isobutyronitrile was used as an initiator for polymerization.

The structure and physical properties of the copolymer were measured. A NCAP film was formed by mixing the copolymer with a low molecular nematic liquid crystal mixture BL-038 (manufactured by Merck Co.), and the stability of the liquid crystal in the copolymer was measured. The method for producing the NCAP film was the same as in Example 1. The composition ratio, viscosity and contact angle with this resulting copolymer are shown in Table 1.

EXAMPLE 7

The same procedure as in example 1 was carried out in a three-necked 100 ml flask equipped with a reflux condenser and a stirrer by using acrylamide (manufactured by Alrich Co.) and methyl vinylacetate (manufactured by Junsei Chemical Co.). However, for this example 3.34 g of a copolymer (AAm-VAc) was produced and the non-water soluble methyl vinylacetate content was adjusted to 25% by weight.

The structure and physical properties of the copolymer were measured. A NCAP film was formed by mixing the copolymer with a low molecular nematic liquid crystal mixture BL-038 (manufactured by Merck Co.), and the stability of the liquid crystal in the copolymer was measured. The method for producing the NCAP film was the same as in Example 1. The composition ratio, viscosity and contact angle with this resulting copolymer are shown in Table 1.

The stability of the copolymers and liquid crystal emulsion synthesized in the above examples was measured by the following methods. The result thereof are shown in Table 1 and FIGS. 4 to 8.

Viscosity

The viscosity of the acrylamide-styrene, acrylamide-methyl methacrylate and acrylamide-methyl vinylacetate copolymers produced as above was measured using the following two machines and respective methods.

1. Ostwalt viscometer

In order to determine the physical properties of the synthesized copolymers, the copolymers were dissolved in distilled water to give a 0.2% by weight solution. 8 ml of this solution was introduced into an Ostwalt viscometer fixed in a thermostatic bath at 30° C. A rubber string was linked to the neck of the viscometer and pressure was applied to induce the solution up to an indicated line. The time required for solution to drop from the indicated line was measured.

2. Ubbelohde viscometer

An acrylamide homopolymer and the acrylamide-styrene copolymer were tested by mixing with a 6% by weight NaCl solution. This mixture was introduced into an Ubbelohde viscometer fixed in a thermostatic bath at 30° C. The change in viscosity according to the concentration of the copolymer was measured.

Coalescence time

Figure 3:
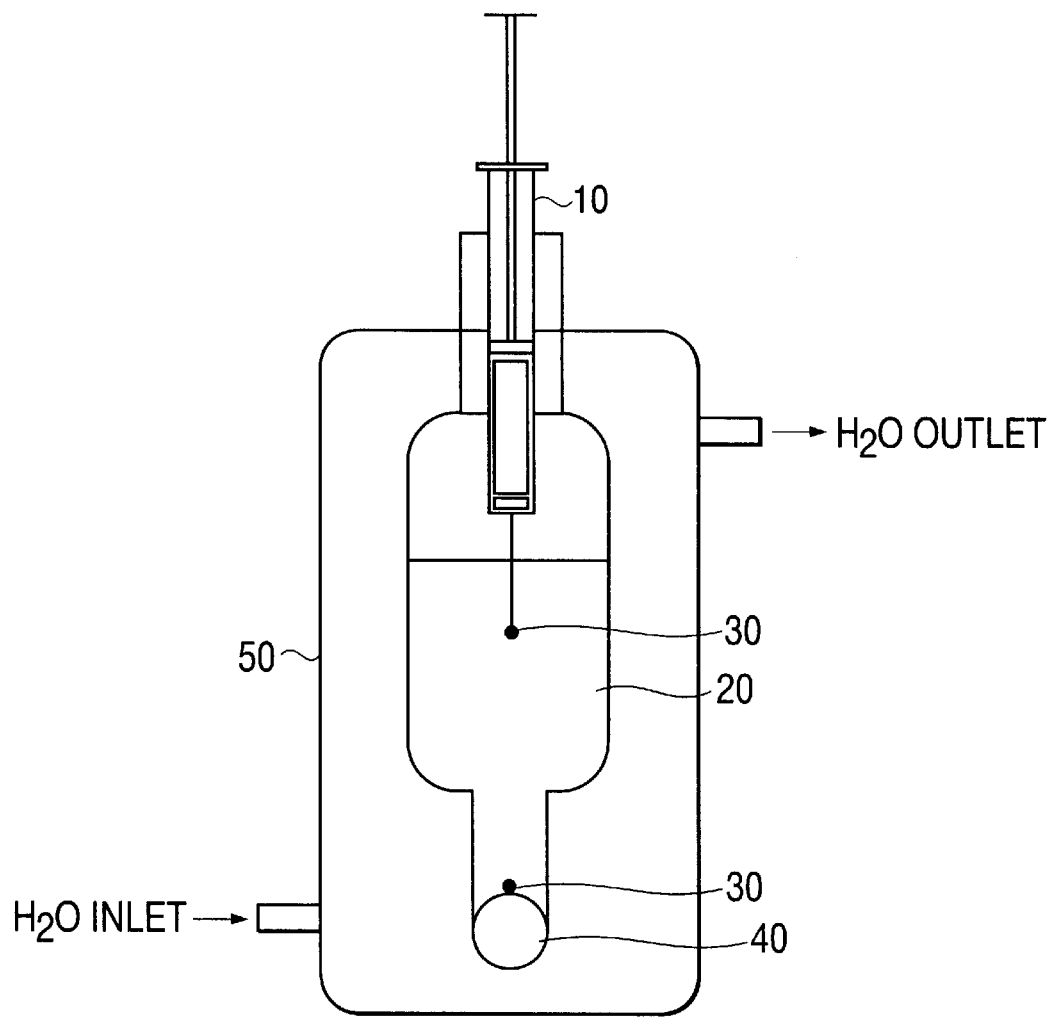
FIG. 3 shows a schematic view of an apparatus for measuring the coalescence time according to the present invention.
Figure 4:
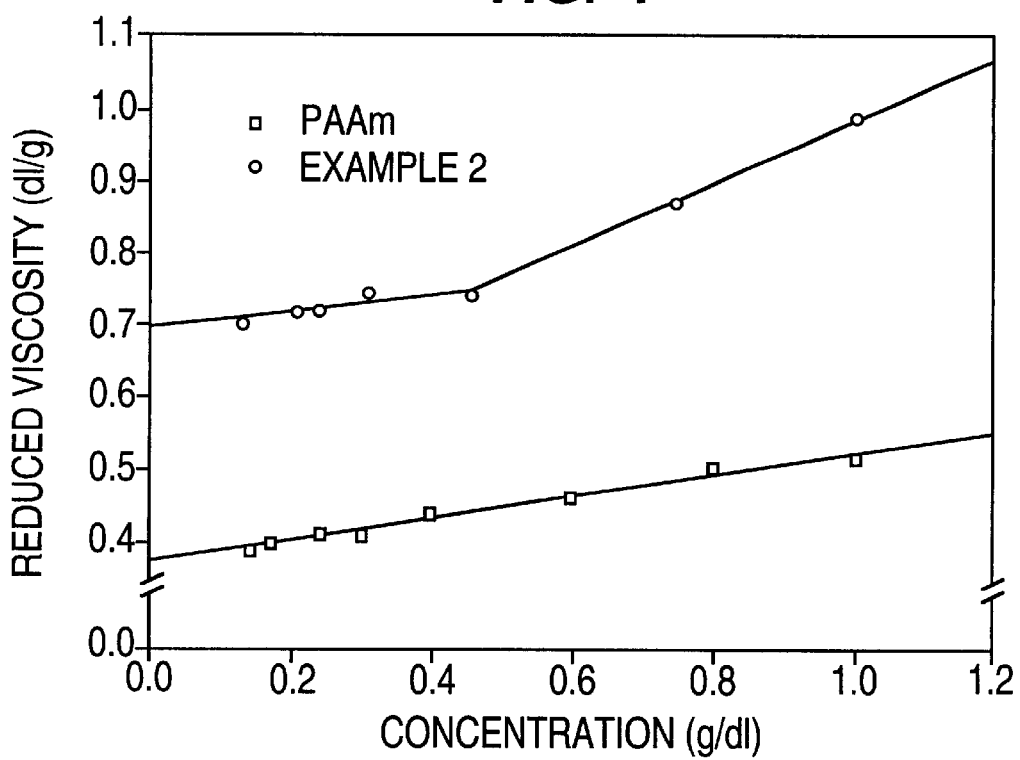
FIG. 4 shows a comparison of the reduced viscosity according to a concentration variation of an acrylamide-styrene copolymer (AAm—St) and an acrylamide homopolymer (PAAm; in a 6% by weight NaCl solution), both in their respective films.
Figure 5:
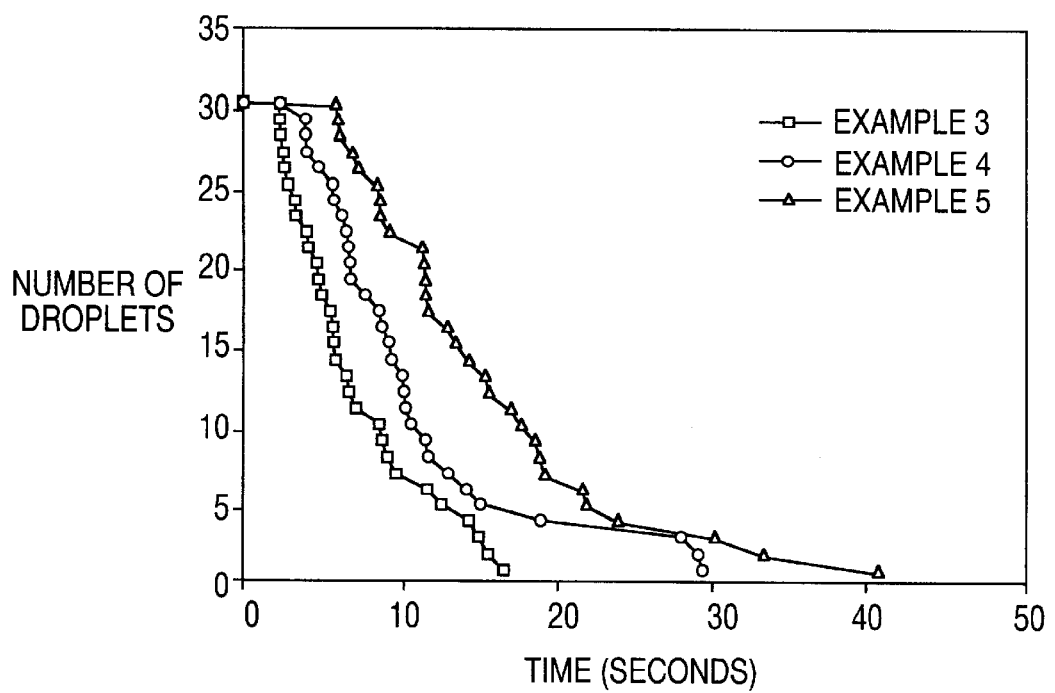
FIG. 5 shows a relationship between the number of liquid crystal droplets and time for Examples 3, 4 and 5.
Figure 6:
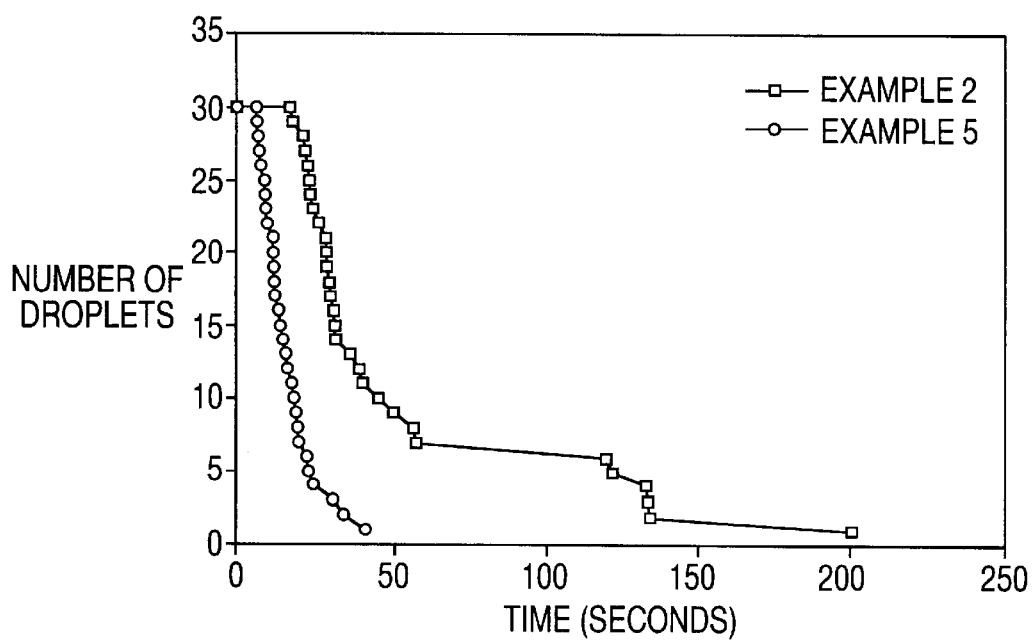
FIG. 6 shows a relationship between the number of liquid crystal droplets and time for Examples 2 and 5.
Figure 7:
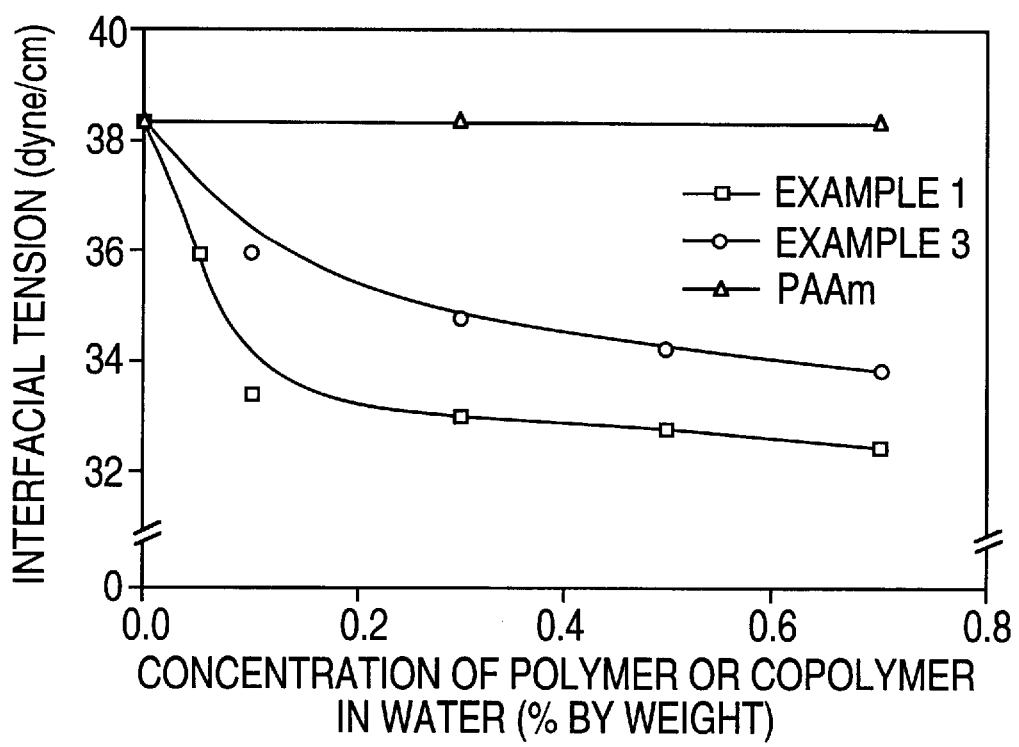
FIG. 7 shows a relationship between concentration variations in the aqueous solution and the interfacial tension on the boundary of the copolymer aqueous solution and liquid crystal droplets.

When an emulsion is formed in an aqueous solution of acrylamide copolymers, the life time of the liquid crystal plays a critical role. In order to examine this property, the synthesized copolymers were dissolved in a water thermostatic bath at 25° C. to produce a 0.7% by weight aqueous solution. Referring to the apparatus shown in FIG. 3, the time required for a drop 30 of liquid crystal to reach a large liquid crystal drop 40 at the bottom of a vessel was measured. The drop 30 of liquid crystal was released from the tip of a microsyringe 10.

Contact angle

The synthesized copolymers were dissolved in water to give a 1.2% by weight aqueous solution. A drop of the liquid crystal was deposited onto a film and the contact angle of the liquid crystal was measured using a Goniometer (manufactured by Rame-Hart Co.).

Interfacial tension

The synthesized copolymers were dissolved in water to produce aqueous solutions having copolymer concentrations ranging from 0.1 to 0.7% by weight. Drops of the liquid crystal (volume and weight thereof were determined) was deposited into the respective aqueous solutions using micro needles and the interfacial tension of the liquid crystal drop was measured using a Goniometer (manufactured by Rame-Hart Co.).

Thickness of the sedimented layer of the liquid crystal emulsion

The synthesized copolymers were dissolved in water to produce aqueous solutions having copolymer concentrations ranging from 0.7% and 15% by weight. The 0.7 wt. % solution and 15 wt. % solution testing results are shown in FIG. 8. Each aqueous solution was introduced into a 7 ml vial and then 1.4% by weight of the liquid crystal was mixed therein and emulsified for one minute in a shaking machine. The resultant emulsions were placed in a 25° C. thermostatic bath and the thickness of the sedimented layers under the condition of creaming was measured using a Cathetometer (manufactured by Gaertner scientific Co., Chicago).

TABLE 1

| | Composition ratio of copolymer (% by weight) | | Contact angle | $H_2O$ water adsorption | |
|---|---|---|---|---|---|
| | $m_1$ (AAm) | $M_2$ | (%) | $H_2O$ g/100 g | Viscosity |
| Ex. 1 | 86 | 14(St) | 18.6 | | 1.18 |
| Ex. 2 | 80 | 20(St) | 9.1 | | 0.91 |
| Ex. 3 | 85 | 15(MMA) | 20.8 | | 1.32 |
| Ex. 4 | 81 | 19(MMA) | 17.8 | | 1.25 |
| Ex. 5 | 78 | 22(MMA) | 17.1 | | 1.30 |
| Ex. 6 | 80 | 20(VAc) | 19.1 | | 1.53 |
| Ex. 7 | 75 | 25(VAc) | 14.6 | | 1.32 |
| Polystyrene | 0 | 100 | 8.0 | 0.048 | |
| Polymethyl metacrylate | 0 | 100 | 10.2 | 1.180 | |
| Polyvinyl acetate | 0 | 100 | 11.1 | 2.200 | |

* Each determined value is expressed as an average value according to examples.
(note)
Ex. = Example, AAm = acrylamide, The copolymer matrix of the present invention functions well in maintaining a liquid crystal emulsion, and this is an essential condition for preparing NCAP films. In addition, the present invention makes it possible to control the size of the liquid crystal emulsion which is dispersed according to the concentration of the copolymer. For these reasons, the copolymer matrix is useful in preparing NCAP films. Furthermore, dispersing agents are not necessary to cause the liquid crystal emulsion to disperse the liquid crystal in the polymer matrix phase. Without dispersing agents, the manufacturing process is simpler and good electro-optical properties are obtained. The liquid crystal emulsion cam be formed into a large plate using the NCAP method.

While the invention has been described in connection with the preferred embodiments, it will be understood that modifications within the principles outlined above will be evident to those skilled in the art. Thus, the invention is not limited to the preferred embodiments, but is intended to encompass such modifications.

What is claimed is:

1. A polymer liquid crystal emulsion, comprising:
   a water soluble copolymer obtained by nematic curvilinear aligned phase polymerization of a hydrophilic monomer with one or more hydrophobic monomers, the content of the one or more hydrophobic monomers being 14 to 25% by weight based on the combined weight of the one or more hydrophobic monomers and the hydrophilic monomer; and
   a liquid crystal, the polymer liquid crystal emulsion containing substantially no dispersion agents.

2. A polymer liquid crystal emulsion according to claim 1, wherein said hydrophilic monomer is acrylamide or a derivative thereof and said hydrophobic monomer is selected from the group consisting of styrene, methyl methacrylate and vinyl acetate.

3. A polymer liquid crystal emulsion according to claim 1, wherein said hydrophobic monomer is selected from the group consisting of styrene, methyl methacrylate, vinyl acetate, acrylate and methacrylate.

4. A polymer liquid crystal emulsion according to claim 1, wherein said hydrophilic monomer is selected from the group consisting of acrylamide, acrylonitrile and acryloylchloride.

5. A polymer liquid crystal emulsion according to claim 1, wherein
   the water soluble copolymer, the liquid crystal and water form a liquid crystal/aqueous polymer solution, and
   the concentration of the liquid crystal in the liquid crystal/aqueous polymer solution is in the range of 50 to 70% by weight.

6. A polymer liquid crystal emulsion according to claim 1, wherein said liquid crystal is a nematic liquid crystal formed of an azomethine compound or an azo compound.

7. A sandwiched nematic curvilinear alignment phase film, comprising:
   a polymer liquid crystal emulsion having:
      a water soluble copolymer obtained by nematic curvilinear aligned phase polymerization of a hydrophilic monomer with one or more hydrophobic monomers, the content of the one or more hydrophobic monomers being 14 to 25% by weight based on the combined weight of the one or more hydrophobic monomers and the hydrophilic monomer; and
      a liquid crystal; and
   a pair of plates sandwiching the polymer liquid crystal emulsion, the sandwiched nematic curvilinear alignment phase film containing substantially no dispersion agents.

8. A sandwiched nematic curvilinear alignment phase film according to claim 7, wherein said hydrophilic monomer is acrylamide or a derivative thereof and said hydrophobic monomer is selected from the group consisting of styrene, methyl methacrylate and vinyl acetate.

9. A sandwiched nematic curvilinear alignment phase film according to claim 7, wherein said hydrophobic monomer is selected from the group consisting of styrene, methyl methacrylate, vinyl acetate, acrylate and methacrylate.

10. A sandwiched nematic curvilinear alignment phase film according to claim 7, wherein said hydrophilic monomer is selected from the group consisting of acrylamide, acrylonitrile and acryloylchloride.

11. A sandwiched nematic curvilinear alignment phase film according to claim 7, wherein the water soluble copolymer, the liquid crystal and water form a liquid crystal/aqueous polymer solution, and the concentration of the liquid crystal in the liquid crystal/aqueous polymer solution is in the range of 50 to 70% by weight.

12. A sandwiched nematic curvilinear alignment phase film according to claim 7, wherein said liquid crystal is a nematic liquid crystal formed of an azomethine compound or an azo compound.

13. A method for producing a nematic curvilinear alignment phase film, comprising the following steps:

a) conducting nematic curvilinear aligned phase polymerization of a hydrophilic monomer with one or more hydrophobic monomers to form a water soluble copolymer, the content of the one or more hydrophobic monomers being 14 to 25% by weight based on the combined weight of the one or more hydrophobic monomers and the hydrophilic monomer;

b) washing and drying the water soluble copolymer and then dissolving the water soluble copolymer in water to form a solution;

c) dispersing a liquid crystal into the solution to produce a liquid crystal/polymer aqueous solution; and d) placing the liquid crystal/polymer aqueous solution between glass substrates in order to remove water therefrom, the nematic curvilinear alignment phase film being produced with substantially no dispersion agents.

14. A method for producing a nematic curvilinear alignment phase film according to claim 13, wherein said hydrophilic monomer is acrylamide or a derivative thereof and said hydrophobic monomer is selected from the group consisting of styrene, methyl methacrylate and vinyl acetate.

15. A method for producing a nematic curvilinear alignment phase film according to claim 13 wherein said hydrophobic monomer is selected from the group consisting of styrene, methyl methacrylate, vinyl acetate, acrylate and methacrylate.

16. A method for producing a nematic curvilinear alignment phase film according to claim 13, wherein said hydrophilic monomer is selected from the group consisting of acrylamide, acrylonitrile and acryloylchloride.

17. A method for producing a nematic curvilinear alignment phase film according to claim 13, wherein the water soluble copolymer, the liquid crystal and water form a liquid crystal/aqueous polymer solution, and the concentration of the liquid crystal in the liquid crystal/aqueous polymer solution is in the range of 50 to 70% by weight.

18. A method for producing a nematic curvilinear alignment phase film according to claim 13, wherein said liquid crystal is a nematic liquid crystal of azomethine compounds or azo compounds.

19. A method for producing a nematic curvilinear alignment phase film according to claim 13, wherein the content of the hydrophobic monomer is 14 to 25% by weight based on the combined weight of the hydrophobic monomer and the hydrophillic monomer.

* * * * *